(12) United States Patent
Schmidt et al.

(10) Patent No.: US 10,844,181 B2
(45) Date of Patent: Nov. 24, 2020

(54) COMPOSITIONS CONTAINING NBR-BASED MICROGELS

(71) Applicant: ARLANXEO DEUTSCHLAND GMBH, Dormagen (DE)

(72) Inventors: Udo Schmidt, Cologne (DE); Christopher Kohl, Mainz (DE); Jiawen Zhou, Dusseldorf (DE); Thomas Fruh, Wuppertal (DE)

(73) Assignee: Arlanxeo Deutschland GmbH, Dormagen (DE)

( * ) Notice: Subject to any disclaimer, the term of this patent is extended or adjusted under 35 U.S.C. 154(b) by 0 days.

(21) Appl. No.: 15/548,269

(22) PCT Filed: Jan. 5, 2016

(86) PCT No.: PCT/EP2016/050082
§ 371 (c)(1),
(2) Date: Aug. 2, 2017

(87) PCT Pub. No.: WO2016/124342
PCT Pub. Date: Aug. 11, 2016

(65) Prior Publication Data
US 2018/0265644 A1  Sep. 20, 2018

(30) Foreign Application Priority Data
Feb. 5, 2015  (EP) .................................. 15153876

(51) Int. Cl.
| | |
|---|---|
| *F26B 3/12* | (2006.01) |
| *C08L 9/02* | (2006.01) |
| *C08J 3/075* | (2006.01) |
| *C08F 236/12* | (2006.01) |
| *C08F 2/22* | (2006.01) |
| *C08J 3/12* | (2006.01) |
| *C09J 147/00* | (2006.01) |
| *C08L 63/00* | (2006.01) |

(52) U.S. Cl.
CPC .............. *C08J 3/075* (2013.01); *C08F 2/22* (2013.01); *C08F 236/12* (2013.01); *C08J 3/12* (2013.01); *C08L 9/02* (2013.01); *C09J 147/00* (2013.01); *C08F 2800/20* (2013.01); *C08J 2300/24* (2013.01); *C08J 2347/00* (2013.01); *C08L 63/00* (2013.01); *F26B 3/12* (2013.01)

(58) Field of Classification Search
None
See application file for complete search history.

(56) References Cited

U.S. PATENT DOCUMENTS

| | | | |
|---|---|---|---|
| 4,892,932 A * | 1/1990 | Rauch | ...................... B01D 1/18 264/11 |
| 8,623,981 B2 | 1/2014 | Obrecht | |
| 9,932,602 B2 | 4/2018 | Spangenberg et al. | |
| 2006/0079609 A1 * | 4/2006 | Nishioka | .................... C08J 5/18 523/400 |
| 2007/0135573 A1 | 6/2007 | Ziser et al. | |
| 2011/0229672 A1 | 9/2011 | Hoffmann et al. | |
| 2016/0075867 A1 | 3/2016 | Ziser et al. | |

FOREIGN PATENT DOCUMENTS

| | | |
|---|---|---|
| CN | 103421143 A | 12/2013 |
| EP | 2463335 A1 | 6/2012 |
| GB | 823823 A | 11/1959 |
| JP | 2007316126 A2 | 12/2007 |
| JP | 2007316127 A2 | 12/2007 |
| JP | 2007316128 A2 | 12/2007 |
| RU | 2464279 C9 | 4/2013 |

OTHER PUBLICATIONS

Blackey, C, Emulsion Polymerization, Theory and Practice, Applied Science Publishers Ltd London, 1975, pp. 329-381.
Hoffmann, M. "Vulcanizate Structure, Relaxation, and Tensile Strength of Polyisoprenes",Rubber Chem. Technol. 36 (1963) pp. 1, pp. 815-834.
Ullmann's Encyclopedia of Industrial Chemistry, 6th edition, vol. 13, pp. 75-108.
Uraneck, C.A. "Molecular Weight Control of Elastomers Prepared by Emulsion Polymerization", Rubber Chemistry and Technology, vol. 49, pp. 610-649.
European Search Report from co-pending Application EP15153876, 2 pages.
International Search Report from co-pending Application PCT/EP2016/050082, 2 pages.
Liu Dahua, et al., "A Comprehensive Handbook of Synthetic Rubber Technology", Chemical Industry Press, Dec. 1991, first edition, first printing, pp. 1297 and 1298 (and English translation).
Huang Liben, et al., "Powdered Rubber", Materials Science and Engineering Publishing Center of Chemical Industry Press, Mar. 2003, first edition, first printing, p. 40 (and English translation).

* cited by examiner

Primary Examiner — Richard A Huhn
(74) Attorney, Agent, or Firm — Norris McLaughlin PA

(57) ABSTRACT

Particulate compositions solid at 20° C. and comprising at least one copolymer based on at least the following comonomers a) to d)
  a) conjugated diene,
  b) α,β-unsaturated nitrile,
  c) at least one polyfunctional radically polymerizable comonomer and
  d) at least one carboxyl-, hydroxyl-, epoxy- and/or amino-group-functional radically polymerizable comonomer, which possess an average particle diameter of the primary particles of 5 to 500 nm, characterized in that these compositions possess a pourability to EN DIN 6186:1998 (funnel diameter 15 mm) of not more than 33 s.

20 Claims, No Drawings

COMPOSITIONS CONTAINING NBR-BASED MICROGELS

The present invention relates to solid compositions comprising specific copolymers having small primary particles in pourable form, to their respective production and to their respective use especially in thermoset compositions.

US2006/0079609 describes the use of crosslinked polymer particles obtained by emulsion polymerization in the modifying of thermosetting epoxy resins. The only means described of working up these particles is coagulation. As described below and shown in the Examples section, coagulates do not fulfil the requirements needed in order to solve the problem.

CN103421143 describes the emulsion polymerization of a rubber in a dispersion of inorganic particles, and the subsequent work-up of the polymer by spray drying. The production of crosslinked, functional, dimensionally stable polymer particles is not described, and nor is any application for the material obtained.

The use of what are called microgels in thermoset compositions is known per se and described for example in EP1674501. The effects described therein are based on a special dispersion of the microgels in the precursors of thermoset production by means of a high-pressure homogenizer. The high-pressure homogenizer is an apparatus which within its homogenizing valve disrupts the microgel particle agglomerates mixed into the thermoset precursor into aggregates and/or primary particles. Agglomerates are physically separable units which when dispersed undergo no change in primary particle size. The product for homogenizing enters the homogenizing valve at slow speed and is accelerated to high speeds in the homogenizing gap. Dispersing takes places downstream of the gap, primarily by means of turbulences and cavitation (William D. Pandolfe, Peder Baekgaard, Marketing Bulletin from APV Homogeniser Group—"High-pressure homogenisers processes, product and applications").

A disadvantage of the high-pressure homogenizer is that it is not a device which is used on a standard basis for dispersing elastomer particles, and is therefore not widespread within the sector.

Furthermore, on passage through the valve, the material heats up greatly, with high temperature peaks, there being a consequent risk of unwanted crosslinking and also of damage to the material.

Since complete dispersing takes a plurality of passes through the homogenizer, this risk increases further. All in all, through the use of the high-pressure homogenizer, there is a drastic increase in the apparatus requirement and also in the labour and time requirements for the production of thermoset compositions.

Another form of the application is described in WO2009/098305. WO 2009098305 teaches the modifying of polyamides by spray-dried, NBR-based rubber gels which are obtained by spray drying the latex. The particle diameter of the gels described therein is only 2 to 300 µm, however. A disadvantage of the particles described is their surface-to-volume ratio, which is poorer than that of the compositions of the invention, thereby resulting in a lower activity when added at the same level, based on weight percentages. This results in relatively high quantities being used to obtain the desired effects.

Microgels with smaller primary particles through emulsion polymerization are in fact also described, in the aforementioned EP1674501, for example, but the directly crosslinked SBR grades described by way of example therein cannot be produced in a suitable form, such as in the form of spray granules, for example, for easy incorporation into the thermoset application medium.

WO2014/174068 describes NBR-based microgels which are incorporated into PVC using extruders. They are present as coagulated lumps and, in the form which is only available on an industrial scale, they take the form of compressed bales, being as little suited as the microgels from EP1674501 to simple and continuous incorporation into thermosets. They also fail to meet the pourability requirements, as will be elucidated hereinafter. The problem addressed, then, was that of providing additives which can be incorporated easily into thermoset compositions, especially additives for improving the impact strength. One of the problems addressed by the invention was that of admixing microgels in order to improve the properties of plastics in such a way as to improve properties such as impact strength and energy absorption to the point of fracture, while at the same time retaining the other qualities such as mechanical strength, glass transition temperature and modulus of elasticity. Another problem addressed by the invention was that of providing microgels which can be dispersed in plastics with little apparatus-related effort and with high efficiency. Little effort in terms of apparatus means, for example, that the use of a dissolver, vacuum dissolver, roll mill, extruder or internal mixer, or other mixture preparation instruments widespread within the industry, is sufficient to produce a homogeneous dispersion of the microgel particles down to the primary particles within customary mixing times. High efficiency is achieved if the material can be metered easily and continuously, being present, for example, in pourable form, having little tendency towards blocking, exhibiting high bulk density, and showing good and uniform quality (no little lumps, non-tacky, no discolorations).

The invention relates to particulate compositions solid at 20° C. and comprising at least one copolymer based on at least the following comonomers a) to d)
a) conjugated diene,
b) $\alpha,\beta$-unsaturated nitrile,
c) at least one polyfunctional radically polymerizable comonomer and
d) at least one carboxyl-, hydroxyl-, epoxy- and/or amino-group-functional radically polymerizable comonomer,
which possess an average particle diameter of the primary particles of 5 to 500 nm, and optionally a release agent, characterized in that these compositions possess a pourability to EN DIN 6186:1998 (funnel diameter 15 mm) of not more than 33 s.

The copolymer of the composition of the invention is elastomeric and is also referred to below as microgel. The term "sold" in the sense of the present invention means preferably that the composition has a dynamic viscosity of greater than 1000 Pas at 20° C. under 1 bar atmospheric pressure.

Component a)

The conjugated diene of component a) may be of any kind. Preference is given to using ($C_4$-$C_6$) conjugated dienes. Particularly preferred are 1,3-butadiene, isoprene, 2,3-dimethylbutadiene, piperylene or mixtures thereof. Especially preferred are 1,3-butadiene and isoprene or mixtures thereof. Especially preferred is 1,3-butadiene.

In one preferred embodiment, the amount of copolymer units based on butadiene of component a) is 10 to 98.5 wt %, preferably 25 to 85 wt %, based on the total amount of all comonomer units.

Component b)

As α,β-unsaturated nitrile it is possible to use any known α,β-unsaturated nitrile, preference being given to ($C_3$-$C_5$)-α,β-unsaturated nitriles such as acrylonitrile, methacrylonitrile, ethacrylonitrile or mixtures thereof. Acrylonitrile is particularly preferred.

In one preferred embodiment the amount of copolymer units based on acrylonitrile of component b) is 0.5 to 80 wt %, preferably 5 to 55 wt %, more preferably 15 to 50 wt %, based on the total amount of all comonomer units.

Component c)

In one preferred embodiment the amount of copolymer units based on component c) is 0.5 to 10 wt %, preferably 0.5 to 8 wt %, more preferably 0.5 to 5 wt %, based on the total amount of all comonomer units.

Component c) is different from components a), b) and d).

The polyfunctional radically polymerizable copolymer of component c) is selected preferably from monomers which have two or more functional, radically polymerizable groups, especially diunsaturated or polyunsaturated monomers, more particularly compounds having 2, 3 or 4 polymerizable C═C double bonds, such as, in particular, diisopropenylbenzene, divinylbenzene, divinyl ether, divinyl sulfone, diallyl phthalate, triallyl cyanurate, triallyl isocyanurate, 1,2-polybutadiene, N,N'-m-phenylenemaleimide, 2,4-tolylenebis(maleimide), triallyl trimellitate, acrylamides such as methylenebisacrylamide, hexamethylene-1,6-bisacrylamide, diethylenetriaminetrismethacrylamide, bis(methacrylamidopropoxy)ethane or 2-acrylamidoethyl acrylate, and also especially preferably polyfunctional acrylates, methacrylates and itaconates of polyhydric $C_2$ to $C_{10}$ alcohols, especially ethylene glycol, 1,2-propanediol, 1,4-butanediol, hexanediol, polyethylene glycol having 2 to 20, especially 2 to 8, oxyethylene units, neopentyl glycol, bisphenol A, glycerol, trimethylolpropane, pentaerythritol and sorbitol with unsaturated polyesters formed from aliphatic diols and polyols, and mixtures thereof.

More preferably the polyfunctional radically polymerizable comonomers of component c) are selected from the following: divinylbenzene, trimethylolpropane trimethacrylate (TMPTMA), trimethylolpropane triacrylate, ethylene glycol dimethacrylate, ethylene glycol diacrylate, butane-1,4-diol di(meth)acrylate and mixtures thereof.

The stated polyfunctional radically polymerizable monomers of component c) serve in particular for crosslinking in the preparation of the copolymer in the composition of the invention.

Component d)

In one preferred embodiment the amount of copolymer units based on component d) is 0.5 to 20 wt %, preferably 1 to 15 wt %, more preferably 1 to 10 wt %, based on the total amount of all comonomer units.

Component d) is different from components a) to c).

Preferred functionalized comonomers of component d) are acrylic acid, methacrylic acid, maleic acid, fumaric acid, itaconic acid, amine-functionalized (meth)acrylates, such as primary aminoalkyl (meth)acrylic esters, such as aminoethyl (meth)acrylate, aminopropyl (meth)acrylate and aminobutyl (meth)acrylate, secondary aminoalkyl (meth)acrylic esters, especially tert-butylamino($C_2$-$C_4$)alkyl (meth)acrylate, acrolein, N-vinyl-2-pyrrolidone. N-vinylimidazole, 2-vinylpyridine, 4-vinylpyridine, N-allylurea and N-allylthiourea, (meth)acrylamides, such as (meth)acrylamide, singly or doubly N-substituted (meth)acrylamides, hydroxy-functionalized (meth)acrylates, such as hydroxyethyl methacrylate (HEMA), hydroxypropyl (meth)acrylate, hydroxybutyl (meth)acrylate, polyethylene glycol (meth)acrylates such as hydroxy- or methoxypolyethylene glycol methacrylate, polypropylene glycol (meth)acrylates, stearyl methacrylate, epoxy-functional monomers such as glycidyl (meth)acrylate, monoesters or diesters of α,β-unsaturated dicarboxylic acids such as alkyl, preferably $C_1$-$C_{10}$ alkyl, especially ethyl, n-propyl, isopropyl, n-butyl, tert-butyl, n-pentyl or n-hexyl, alkoxyalkyl, preferably $C_2$-$C_{12}$ alkoxyalkyl, more preferably $C_3$-$C_8$ alkoxyalkyl, hydroxyalkyl, preferably $C_1$-$C_{12}$ hydroxyalkyl, more preferably $C_2$-$C_8$ hydroxyalkyl, cycloalkyl, preferably $C_5$-$C_{12}$ cycloalkyl, more preferably $C_8$-$C_{12}$ cycloakyl, alkylcycloalkyl, preferably $C_8$-$C_{12}$ alkylcycloalkyl, more preferably $C_7$-$C_{10}$ alkylcycloalkyl, aryl, preferably $C_6$-$C_{14}$ aryl, monoesters or diesters, it being possible for the esters also to be mixed esters in the case of the diesters, and mixtures thereof.

Further Monomers

The copolymer in the composition of the invention may further comprise 0 to 20 wt % of further structural units based on radically polymerizable monomers e), which are different from components a) to d). The radically polymerizable monomer e) is selected preferably from the following: styrene, isoprene, 2-chlorobutadiene, 2,3-dichlorobutadiene, esters of acrylic and methacrylic acid, such as ethyl (meth) acrylate, methyl (meth)acrylate, n-propyl (meth)acrylate, n-butyl (meth)acrylate, 2-ethylhexyl (meth)acrylate and also tetrafluoroethylene, vinylidene fluoride, hexafluoropropene and mixtures thereof.

The copolymer in the composition of the invention is preferably a copolymer based on butadiene, acrylonitrile, trimethylolpropane trimethacrylate (TMPTMA) and at least one monomer selected from the group of hydroxyethyl methacrylate (HEMA), acrylic acid, methacrylic acid, glycidyl methacrylate, vinylpyridine, vinylimidazole and methacrylamide.

The copolymer in the composition of the invention is preferably a microgel not crosslinked by high-energy radiation. High-energy radiation here means, expediently, electromagnetic radiation with a wavelength of less than 0.1 μm.

The primary particles of the microgel in the composition of the invention preferably have an approximately spherical geometry. Primary particles according to DIN 53206:1992-08 are the microgel particles dispersed in the coherent phase that are detectable as individual particles by means of suitable physical methods (electron microscope) (cf. e.g. Römpp Lexikon, Lacke und Druckfarben, Georg Thieme Verlag, 1998). An "approximately spherical" geometry means that the dispersed primary particles of the microgels can be seen to form substantially a circular area when a thin section is viewed using an electron microscope. This distinguishes the microgels in the compositions of the invention substantially from dispersed rubber phases that have been generated by "in situ" methods, which in general have an irregular form. The microgel particles in the composition of the invention retain their substantially uniform sphere form, resulting from the separate preparation process of the microgel rubber phase, in the course of dispersing during mixture production in the thermoset polymer, with virtually no change. As a result of the method of dispersing that is described later on below, the fine particle size distribution of the microgels in the microgel latex can be transposed approximately to the mixture, since there is virtually no change in the microgels and in their particle size distribution when the composition is formed.

The primary particles of the microgel in the composition of the invention preferably have an average particle diameter of 5 to 500 nm, more preferably of 20 to 400 nm, more preferably still of 20 to 300 nm, more preferably still of 20 to 250 nm, more preferably still 20 to 150 nm and more preferably still 30 to 90 nm.

Because there is substantially no change in the average particle diameter of the primary particles of the microgels when the compositions of the invention are produced, the average particle diameter of the primary particles of the microgels in the composition also corresponds practically to the average particle diameter of the primary particles in the dispersion of the application medium, more particularly the thermoset polymer or solution thereof, a solution of a microgel/thermoplastic mixture or other dissolved mixtures. It can be determined by ultracentrifugation on dispersions suitable for the purpose, in accordance with DIN 53206.

In the latex of the copolymer prepared preferably by emulsion polymerization, the size of the primary particles can also be determined approximately by dynamic light scattering on a diluted sample. Lasers operating at 633 nm (red) and at 532 nm (green) are customary. In the case of dynamic light scattering, a middle value of the particle size distribution curve is obtained.

The average diameter of the microgels prepared preferably by emulsion polymerization can be set with high precision at, for example, 0.1 µm (100 nm)+/-0.01 µm (10 nm), thus producing, for example, a particle size distribution in which at least 75% of all the microgel particles have a size of between 0.095 µm and 0.105 µm. Other average diameters of the microgels, especially in the range between 5 to 500 nm, can be produced and employed with high precision (at least 75 wt % of all particles are situated around the maximum of the integrated particle size distribution curve (determined by ultracentrifugation) within a range of +10% above and below the maximum). As a result it is possible to precision-tailor the morphology of the microgels in the composition of the invention in practice.

The microgels in the composition of the invention preferably have fractions insoluble in toluene at 23° C. (gel content) of at least about 70 wt %, more preferably at least about 80 wt %, more preferably still at least about 90 wt %. The gel content is determined in toluene at 23° C. For this purpose, 250 mg of the microgel are swollen in 25 ml of toluene at 23° C. with shaking for 24 hours. Centrifugation at 20 000 rpm separates off the insoluble fraction, which is dried. The gel content is the ratio of the dried residue to the initial mass, and is reported in percent.

The microgels in the composition of the invention preferably have a swelling index in toluene at 23° C. of less than about 80, more preferably of less than 60, more preferably still of less than 40. Thus the swelling indices (Qi) of the microgels may with particular preference be between 1-15 and 1-10. The swelling index is calculated from the weight of the solvent-containing microgel swollen in toluene at 23° C. for 24 hours (after centrifugation at 20 000 rpm) and the weight of the dry microgel, as follows:

$Qi$=wet weight of microgel/dry weight of microgel

For determining the swelling index, it is possible more precisely to swell 250 mg of the microgel in 25 ml of toluene for 24 hours with shaking. The gel is centrifuged off, weighed wet, then dried to constant weight at 70° C. and weighed again.

The microgels in the composition of the invention preferably have glass transition temperatures Tg of −100° C. to +120° C., more preferably of −100° C. to +50° C., more preferably still of −80° C. to +20° C., more preferably still of −50° C. to +15° C., especially −50° C. to 10° C., more particularly −50° C. to 0° C.

The microgels in the composition of the invention preferably have a width of the glass transition of greater than 5° C., preferably greater than 10° C., more preferably greater than 15° C. Microgels having such a width of the glass transition are generally not completely homogeneously crosslinked, in contrast to microgels which are completely homogeneously radiation-crosslinked.

The glass transition temperature and the width of the glass transition (ΔTg) of the microgels is determined by means of differential scanning calorimetry (DSC). For the determination of Tg and ΔTg, two cooling/heating cycles are run. Tg and ΔTg are determined in the second heating cycle. For the determinations, 10-12 mg of the selected microgel are used in a DSC sample holder (standard aluminium boat) from Perkin-Elmer. The first DSC cycle is run, with the sample first being cooled to −100° C. with liquid nitrogen and then heated to +150° C. at a rate of 20 K/min. The second DSC cycle is commenced by immediate cooling of the sample as soon as the sample temperature of +150° C. has been reached. Cooling takes place at a rate of approximately 320 K/min. In the second heating cycle, as in the first cycle, the sample is again heated to +150° C. The heating rate in the second cycle is again 20 K/min. Tg and ΔTg are determined graphically from the DSC curve of the second heating operation. For this purpose, three straight lines are placed against the DSC curve. The 1st line is placed on the part of the DSC curve below Tg, the 2nd line at the branch of the curve which passes through Tg, with point of inflection, and the 3rd line at the curve branch of the DSC curve above Tg. In this way, three lines with two points of intersection are obtained. The two points of intersection are each marked by a characteristic temperature. The glass transition temperature Tg is obtained as the middle value of these two temperatures, and the width of the glass transition, ΔTg, is obtained from the difference between the two temperatures.

The hydroxyl group content of the microgels in the composition of the invention can be determined by reaction with acetic anhydride and titration of the acetic acid liberated in this reaction with KOH in accordance with DIN 53240, as hydroxyl number, with the units mg KOH/g polymer. The hydroxyl number of the microgels in the composition of the invention is preferably 0.1 to 100, more preferably 0.5 to 50 mg KOH/g polymer.

Within the determination of the hydroxyl number, it is likewise possible to determine the acid number of the microgels. For this purpose the sample material is not reacted with acetic anhydride, but is instead titrated directly with KOH solution, giving the acid number in the units mg KOH/g polymer. The acid number of the microgels in the composition of the invention is preferably between 4 and 100, more preferably between 5 and 50 mg KOH/g polymer, more particularly from 7.5 to 40 mg KOH/g polymer.

The fraction of release agent as part of the overall mass of the composition of the invention is preferably 0-20, more preferably 0-15, more preferably still 1-10%. The compositions of the invention preferably possess a bulk density of 160 to 600 g/l.

Method

The invention also relates to a method for producing the solid compositions of the invention, characterized in that at least components a) to d) are subjected to an emulsion polymerization and subsequently are spray-dried, optionally after addition of a release agent.

The emulsion polymerization is conducted preferably to conversions ≥70 mol %, preferably ≥80 mol %, more preferably ≥90 mol %, based on the total amount of the monomers used. When conversions are reached in the range from ≥70 to 100%, preferably in the range from ≥80 to 100%, more particularly in the range from ≥90 to 100%, the polymerization is generally stopped.

The polymerization temperature is in general in the range from ≥5 to 100° C., preferably ≥5 to 90° C., more particularly from 8 to 80° C.

Emulsifiers:

Emulsion polymerizations are generally carried out using emulsifiers. For this purpose there is a wide spectrum of emulsifiers known and available to the skilled person. Emulsifiers which can be used include, for example, anionic emulsifiers or else neutral emulsifiers. Anionic emulsifiers are used with preference, more particularly in the form of water-soluble salts.

Anionic emulsifiers which can be used include modified resin acids, obtained by dimerization, disproportionation, hydrogenation and modification of resin acid mixtures which contain abietic acid, neoabietic acid, palustric acid and laevopimaric acid. One particularly preferred modified resin acid is disproportionated resin acid (Ullmann's Encyclopedia of Industrial Chemistry, 6th edition, volume 31, pp. 345-355).

Other anionic emulsifiers which can be used are fatty acids. These acids contain 6 to 22 C atoms per molecule. They may be fully saturated or else may have one or more double bonds in the molecule. Examples of fatty acids are caproic acid, lauric acid, myristic acid, palmitic acid, stearic acid, oleic acid, linoleic acid, linolenic acid. The carboxylic acids are customarily based on oils or fats of specific origin such as, for example, castor oil, cottonseed, peanut oil, linseed oil, coconut fat, palm kernel oil, olive oil, rapeseed oil, soybean oil, fish oil and bovine tallow etc. (Ullmann's Encyclopedia of Industrial Chemistry, 6th edition, volume 13, pp. 75-108). Preferred carboxylic acids derive from coconut fatty acid and from bovine tallow and are partly or fully hydrogenated.

Carboxylic adds of this kind based on modified resin acids and/or fatty acids are used in the form of water-soluble lithium, sodium, potassium and ammonium salts. The sodium and potassium salts are preferred.

Further anionic emulsifiers are sulfonates, sulfates and phosphates bonded to an organic radical. Suitable organic radicals include aliphatic, aromatic, alkylated aromatics, fused aromatics, and also methylene-bridged aromatics; the methylene-bridged and fused aromatics may additionally be alkylated. The length of the alkyl chains is 6 to 25 C atoms. The length of the alkyl chains bonded to the aromatics is between 3 and 12 C atoms.

The sulfates, sulfonates and phosphates are used in the form of lithium, sodium, potassium and ammonium salts. The sodium, potassium and ammonium salts are preferred.

Examples of such sulfonates, sulfates and phosphates are Na lauryl sulfate, Na alkylsulfonate, Na alkylarylsulfonate, Na salts of methylene-bridged arylsulfonates, Na salts of alkylated naphthalenesulfonates, and also the Na salts of methylene-bridged naphthalenesulfonates, which may also be oligomerized, in which case the degree of oligomerization is between 2 to 10. The alkylated naphthalenesulfonic acids and the methylene-bridged (and optionally alkylated) naphthalenesulfonic acids are customarily in the form of isomer mixtures, which may also contain more than one sulfonic acid group (2 to 3 sulfonic acid groups) in the molecule. Particularly preferred are Na lauryl sulfate, Na alkylsulfonate mixtures having 12 to 18 C atoms, Na alkylarylsulfonates, Na diisobutylenenaphthalenesulfonate, methylene-bridged polynaphthalenesulfonate mixtures, and methylene-bridged arylsulfonate mixtures.

Neutral emulsifiers derive from, preferably, adducts of ethylene oxide and of propylene oxide with compounds having sufficiently acidic hydrogen. These include, for example, phenol, alkylated phenol and alkylated amines. The average degrees of polymerization of the epoxides are between 2 to 20. Examples of neutral emulsifiers are ethoxylated nonylphenols having 8, 10 and 12 ethylene oxide units. The neutral emulsifiers are customarily used not alone but instead in combination with anionic emulsifiers.

Preferred are the Na and K salts of disproportionated abietic acid and of partially hydrogenated tallow fatty acid, and also mixtures thereof, sodium lauryl sulfate. Na alkylsulfonates, sodium alkylbenzenesulfonate, α-olefin sulfonates and also alkylated and methylene-bridged naphthalenesulfonic acids.

The emulsifiers are used preferably in an amount of 0.2 to 15 parts by weight, preferably 0.5 to 12.5 parts by weight, more preferably 1.0 to 10 parts by weight, based on 100 parts by weight of the monomer mixture.

The emulsion polymerization is generally carried out using the stated emulsifiers. If, after the end of the polymerization, latices are obtained which have a tendency towards premature self-coagulation, owing to a certain instability, it is also possible for the stated emulsifiers to be added afterwards in order to stabilize the latices as well. This may be necessary in particular before the removal of unreacted monomers by treatment with steam and also before latex storage or before the spray-drying is carried out.

Chain Transfer Agents:

The emulsion polymerization is preferably carried out such that in particular the microgels in the composition of the invention crosslink during the polymerization. Generally speaking, therefore, there is no need to use chain transfer agents. It is nevertheless possible to use chain transfer agents. The agent in that case is used customarily in an amount of 0.01 to 3.5 parts by weight, preferably of 0.05 to 2.5 parts by weight, per 100 parts by weight of the monomer mixture. Chain transfer agents used may, for example, be mercaptan-containing carboxylic acids, mercaptan-containing alcohols, xanthogen disulfides, thiuram disulfides, halogenated hydrocarbons, branched aromatic or aliphatic hydrocarbons, and also linear or branched mercaptans. These compounds customarily have 1 to 20 carbon atoms (see Rubber Chemistry and Technology (1976), 49(3), 610-49 (Üraneck, C. A.): "Molecular weight control of elastomers prepared by emulsion polymerization" and D. C. Blackley, Emulsion Polymerization, Theory and Practice, Applied Science Publishers Ltd London, 1975, pp. 329-381).

Examples of mercaptan-containing alcohols and mercaptan-containing carboxylic acids are monothioethylene glycol and mercaptopropionic acid.

Examples of xanthogen disulfides are dimethylxanthogen disulfide, diethylxanthogen disulfide and diisopropylxanthogen disulfide.

Examples of thiuram disulfides are tetramethylthiuram disulfide, tetraethylthiuram disulfide and tetrabutylthiuram disulfide.

Examples of halogenated hydrocarbons are carbon tetrachloride, chloroform, methyl iodide, diiodomethane, difluorodiiodomethane, 1,4-diiodobutane, 1,6-diiodohexane, ethyl bromide, ethyl iodide, 1,2-dibromotetrafluoroethane, bromotrifluoroethene, bromodifluoroethene.

Examples of branched hydrocarbons are those from which a H radical can be easily eliminated. Examples of such are toluene, ethylbenzene, cumene, pentaphenylethane, triphenylmethane, 2,4-diphenyl-4-methyl-1-pentene, dipentene, and also terpenes such as, for example, limonene, α-pinene, beta-pinene, α-carotene and beta-carotene.

Examples of linear or branched mercaptans are n-hexyl mercaptan or else mercaptans which contain 9-16 carbon atoms and at least three tertiary carbon atoms, the sulfur being bonded to one of these tertiary carbon atoms. These mercaptans may be used either individually or in mixtures. Suitable, for example, are the addition compounds of hydrogen sulfide with oligomerized propene, especially tetrameric propene, or with oligomerized isobutene, especially trimeric isobutene, which are frequently identified in the literature as tertiary dodecyl mercaptan ('t-DDM').

Such alkylthiols and (Isomer) mixtures of alkylthiols are either available commercially or else are preparable for the skilled person by processes which are adequately described in the literature (see e.g. JP 07-316126. JP 07-316127 and JP 07-316128 and also GB 823,823 and GB 823,824).

The individual alkylthiols and/or mixtures thereof are used customarily in an amount of 0.05 to 3 parts by weight, preferably of 0.1 to 1.5 parts by weight, per 100 parts by weight of the monomer mixture.

The metering of the chain transfer agent or mixture of chain transfer agents is done either at the beginning of the polymerization or else in portions in the course of the polymerization, with preference being given to the portionwise addition of all or some components of the chain transfer agent mixture during the polymerization.

Initiators:

The emulsion polymerization is initiated typically using polymerization initiators which undergo decomposition to form radicals (radical polymerization initiators). They include compounds which contain a —O—O— unit (peroxo compounds) or a —N=N— unit (azo compounds).

The peroxo compounds include hydrogen peroxide, peroxodisulfates, peroxodiphosphates, hydroperoxides, peracids, peracid esters, peracid anhydrides and peroxides having two organic radicals. Suitable salts of peroxodisulfuric acid and of peroxodiphosphoric acid are the sodium, potassium and ammonium salts. Examples of suitable hydroperoxides are tert-butyl hydroperoxide, cumene hydroperoxide and p-menthane hydroperoxide. Suitable peroxides having two organic radicals are dibenzoyl peroxide, 2,4-dichlorobenzoyl peroxide, di-tert-butyl peroxide, dicumyl peroxide, tert-butyl perbenzoate, tert-butyl peracetate etc. Suitable azo compounds are azobisisobutyronitrile, azobisvaleronitrile and azobiscyclohexanenitrile.

Hydrogen peroxide, hydroperoxides, peracids, peracid esters, peroxodisulfate and peroxodiphosphate are also used in combination with reducing agents. Suitable reducing agents are sulfenates, sulfinates, sulfoxylates, dithionite, sulfite, metabisulfite, disulfite, sugars, ureas, thiourea, xanthogenates, thioxanthogenates, hydrazinium salts, amines and amine derivatives such as aniline, dimethylaniline, monoethanolamine, diethanolamine or triethanolamine, initiator systems which consist of an oxidizing agent and of a reducing agent are called redox systems. Where redox systems are used, salts of transition metal compounds such as iron, cobalt or nickel in combination with suitable complexing agents such as sodium ethylenediaminetetraacetate, sodium nitrilotriacetate and also trisodium phosphate or tetrapotassium diphosphate are frequently used additionally.

Examples of preferred redox systems are as follows: 1) potassium peroxodisulfate in combination with triethanolamine; 2) ammonium peroxodisulfate in combination with sodium metabisulfite ($Na_2S_2O_5$); 3) p-menthane hydroperoxide/sodium formaldehyde-sulfoxylate in combination with Fe(II) sulfate ($FeSO_4 \times 7\ H_2O$), sodium ethylenediaminoacetate and trisodium phosphate; 4) cumene hydroperoxide/sodium formaldehyde-sulfoxylate in combination with Fe(II) sulfate ($FeSO_4 \times 7\ H_2O$), sodium ethylenediaminoacetate and tetrapotassium diphosphate.

The amount of oxidizing agent is preferably 0.001 to 1 part by weight, more particularly 0.001 to 0.09 part by weight, per 100 parts by weight of monomer. The molar amount of reducing agent is between 50% to 500%, based on the molar amount of the oxidizing agent used.

The molar amount of complexing agent is based on the amount of transition metal used and is customarily equimolar with that amount.

For the implementation of the polymerization, some or all components of the initiator system are metered into the polymerization at the beginning of the polymerization or during the polymerization.

The portionwise addition of some and also all components of the activator system during the polymerization is preferred. Through the sequential addition it is possible to control the reaction rate.

The polymerization time is generally in the range from 5 h to 30 h and is dependent substantially on the acrylonitrile content of the monomer mixture, on the activator system and on the polymerization temperature.

In the polymerization the aim is to maximize polymerization conversions in order to crosslink the copolymer. For this reason there is no need to use stoppers. If stoppers are nevertheless used, suitable examples include dimethyl dithiocarbamate, Na nitrite, mixtures of dimethyl dithiocarbamate and Na nitrite, hydrazine and hydroxylamine and also salts derived from them such as hydrazinium sulfate and hydroxylammonium sulfate, diethylhydroxylamine, diisopropylhydroxylamine, water-soluble salts of hydroquinone, sodium dithionite, phenyl-α-naphthylamine and aromatic phenols such as tert-butylpyrocatechol, or phenothiazine.

The amount of water used in the emulsion polymerization is in the range from 70 to 300 parts by weight, preferably in the range from 80 to 250 parts by weight, more preferably in the range from 90 to 200 parts by weight of water per 100 parts by weight of the monomer mixture.

For reducing the viscosity during the polymerization, for pH adjustment and as pH buffers it is possible for salts to be added to the aqueous phase during the emulsion polymerization. Typical salts are salts of monovalent metals in the form of potassium and sodium hydroxide, sodium hydroxide, sodium sulfate, sodium carbonate, sodium hydrogencarbonate, sodium chloride and potassium chloride. Preferred are sodium and potassium hydroxide, sodium hydrogencarbonate, sodium chloride and potassium chloride. The amounts of these electrolytes are in the range from 0 to 1 part by weight, preferably 0 to 0.5 part by weight, based on 100 parts by weight of the monomer mixture.

The polymerization may be carried out either batchwise or else continuously in a stirred tank cascade.

In order to achieve a uniform polymerization profile, preferably only part of the initiator system is used for the start of the polymerization, and the remainder is metered in subsequently during the polymerization. The polymerization is customarily started with 10 to 80 wt %, preferably 30-50 wt %, of the total amount of initiator. The subsequent metering of individual constituents of the initiator system is also possible.

If the intention is to produce chemically uniform products, acrylonitrile and/or butadiene are metered in subsequently if the composition is outside the azeotropic butadiene/acrylonitrile ratio. Subsequent metering is preferably the case for NBR products with acrylonitrile contents of 10 to 34 wt % and also for the products with 40 to 50 wt % acrylonitrile (W. Hofmann, Rubber Chem. Technol. 36 (1963) 1). The subsequent metering takes place—as indicated in DD 154 702, for example—preferably under computer control on the basis of a computer program.

For the removal of unreacted monomers and also of volatile constituents, the stopped latex is subjected to a steam distillation. In this operation, temperatures in the range from 70 to 150° C. are employed, the pressure being reduced in the case of temperatures <100° C.

The removal of the volatile constituents may be preceded by subsequent latex stabilization with the emulsifier. This is usefully done using the aforementioned emulsifiers in amounts of 0.1 to 2.5 wt %, preferably 0.5 to 2.0 wt %, based on 100 parts by weight of copolymer in the composition of the invention.

The microgels produced by the emulsion polymerization are worked up by spray drying, which takes place likewise preferably in the presence of release agents.

Before or during work-up, one or more ageing inhibitors may be added to the latex. Suitable for this purpose are phenolic, aminic and also other ageing inhibitors.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, 2,2-methylenebis(6-tert-butyl)-p-cresol, poly(dicyclopentadiene-co-p-cresol), sterically hindered phenols containing ester groups such as n-octadecyl 1-(4-hydroxy-3,5-di-tert-butylphenyl)propionate, sterically hindered phenols containing thioethers, 2,2'-methylenebis(4-methyl-6-tert-butylphenol) (BPH), 2-methyl-4,6-bis(octylsulfanylmethyl)phenol and also sterically hindered thiobisphenols. In particularly suitable embodiments, two or more ageing inhibitors are also added, such as, for example, a mixture of n-octadecyl β-(4-hydroxy-3,5-dl-tert-butylphenyl)propionate, poly(dicyclopentadiene-co-p-cresol) and 2-methyl-4,6-bis(octylsulfanylmethyl)phenol.

If discoloration of the rubber is not important, aminic ageing inhibitors are also used, examples being mixtures of diaryl-p-phenylenediamines (DTPD), octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD) or N,N'-bis(1,4-dimethylpentyl)-p-phenylenediamine (77PD).

The other ageing inhibitors include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are used generally in combination with phenolic ageing inhibitors. TMQ, MBI and MMBI are used in particular for NBR products which are peroxidically vulcanized.

The spray drying of the latices from the emulsion polymerization takes place in general in customary spraying towers. In this case the latex, preferably heated at 15 to 100° C., is conveyed via pumps into the spraying tower and sprayed through nozzles, located for example at the top of the tower, at pressures of 50 to 500 bar, preferably 100 to 300 bar. Hot air with an entry temperature of preferably 100 to 350° C. is supplied for example in counter-current and evaporates the water. The powder falls downwards and the dry powder is removed at the foot of the tower. Any release agents and other additives used, such as, for example, ageing inhibitors, antioxidants, optical brighteners, etc., are blown in preferably as dry powders likewise at the top of the tower. They may also be admixed completely or partly to the latex prior to spray drying. The latices supplied to the spraying tower preferably have solids concentrations of 10 to 60, more preferably 20 to 50 wt %, more preferably still 30 to 50 wt %, based on the latex. Through this mode of work-up, in particular, spherical or virtually spherical microgel particle agglomerates are obtained. The solid compositions of the invention are preferably in the form of agglomerates of the primary particles with an average particle diameter of 2 to 2000 μm, preferably 2 to 500 μm, more particularly of 5 to 200 μm.

In the work-up of the latex by spray drying, it is preferably possible additionally to add commercial release agents as well. The release agents are preferably selected from silicas, especially those having a BET specific surface area of more than 5 ml/g, which may also have been chemically modified, especially hydrophobized, or calcium carbonate, magnesium carbonate, silicates such as talc and mica, fatty acid salts, especially alkali metal and alkaline earth metal salts such as salts of fatty acids having more than 10 carbon atoms such as, in particular, calcium salts and magnesium salts of such fatty acids such as calcium stearate, magnesium stearate and aluminium zinc stearate, calcium phosphate, aluminium oxide, barium sulfate, zinc oxide, titanium dioxide, polymers with a high glass transition temperature, of more than 60° C., for example, such as polyesters, polyolefins, polyvinyl chloride and starch, hydrophilic polymers such as polyvinyl alcohol, polyalkylene oxide compounds, especially polyethyleneoxide compounds such as polyethylene glycols or polyethylene glycol ethers, polyacrylic acid, polyvinylpyrrolidone and cellulose derivatives, hydrofluorocarbon polymers and mixtures of the stated release agents.

If release agents are used, they are more preferably selected from the group of silica, calcium carbonate, silicate and fatty acid salts, and are added during the work-up of the microgels after the emulsion polymerization. The microgel, however, may also be converted without addition of a separate release agent into the desired, advantageous use form.

The spray granules are preferably obtained by spray drying of the latices obtained from the emulsion polymerization, optionally with the use of release agents, as described above.

The invention also relates to the use of the solid composition of the invention as an additive in thermoset compositions, preferably for the purpose of increasing toughness and energy absorption prior to fracture.

Thermoset Compositions

The invention relates further to thermoset compositions comprising at least

A) a solid composition of the invention and

B) a thermosetting polymer.

In the thermoset composition of the invention, the weight ratio of the thermosetting polymer B) to the solid composition A) of the invention is preferably 0.5:99.5 to 99.5:0.5, preferably 2:98 to 98:2, more preferably from 2:98 to 15:85.

Thermosetting Polymer

The thermosetting polymers of the component B) are preferably thermosets, also called thermosetting resins. Thermosets are preferably tightly crosslinked polymers with a three-dimensional structure, which by permanent chemical linking between the components have been rendered insoluble and infusible. Customarily the thermosets are produced by the combining of at least two reactive components of relatively high functionality the functionality of the reactants is typically ≥2. After the components have been thoroughly mixed, the mixture of the thermoset components is placed in a mould or between adherends and the mixture is allowed to cure, often under the influence of heat and/or high-energy radiation.

The thermosetting polymer B) in the thermoset composition of the invention is preferably selected from the group consisting of polycondensation thermosets, polyaddition thermosets and addition-polymerization thermosets. Known examples of thermosets are resins/adhesives such as phenolic resins, especially phenol-formaldehyde resins, amino resins, especially melamine-formaldehyde resins, epoxy resins, unsaturated polyester resins, acrylic resins, RIM polyurethane systems, PU resins and foams, epoxy adhesives, PU adhesives, UP adhesives, cyanoacrylate and methacrylate adhesives, silicone resins and silicone adhesives, silane-crosslinking resins and adhesives, furan resins, polyimides, resins and adhesives composed of unsaturated polyesters, vinyl and/or acrylic esters, etc.

The thermosetting polymers, i.e. resins and adhesives, are preferably selected from the group consisting of diallyl phthalate resins, epoxy resins, amino resins such as urea-formaldehyde resins, melamine-formaldehyde resins, melamine/phenol-formaldehyde resins, phenolic resins such as melamine-phenol-formaldehyde resins, phenol-formaldehyde resins, cresol-formaldehyde resins, resorcinol-formaldehyde resins, xylenol-formaldehyde resins, furfuryl alcohol-formaldehyde resins, unsaturated polyester resins, polyurethane resins, reaction injection moulded polyurethane resins (RIM-PU), furan resins, vinyl ester resins, polyester-melamine resins, mixtures of diallyl phthalate resins or diallyl isophthalate resins.

Particularly preferred are PU, RIM-PU, amino resin and phenolic resin, epoxy and UP systems. Thermosetting polymers of this kind are known per se and for their preparation it is possible to refer for example to Saechlling, Kunststoff Taschenbuch, 28th edition, section 4.17; Ullmann's Encyclopedia of Industrial Chemistry, 5th edition, volume A26, page 665 ff.; Ullmann ibid, volume 9, page 547 ff., Elias, Makromoleküte, volume 2, Technologie, 5th edition, section 15.6.

The thermoset composition of the invention is produced preferably by mixing of components A) and B).

The thermoset compositions of the invention preferably comprise one or more plastics additives, selected preferably from the group consisting of the following: filing and reinforcing agents, pigments, UV absorbers, flame retardants, defoamers, deaerating agents, wetting and dispersing assistants, glass and carbon fibres, fabrics and scrims, carbon nanotubes, graphene, catalysts, thickeners, anti-settling agents, anti-shrink additives, thixotropic agents, release agents, flow control agents, adhesion promoters, dulling agents, corrosion inhibitors, slip additives, biocides, etc. The plastics additives are preferably selected from organic and/or inorganic fillers such as wood flour, cellulose, cotton fibres, artificial-silk strands, mineral fibres, finely ground minerals, mica, short and long fibres, glass mats, carbon fibres, plasticizers, organic and/or inorganic pigments, flame retardants, anti-pest agents, such as agents against termites, agents against rodent biting, etc., and other customary plastics additives. Particularly preferred are fibrous fillers. They may be present in the compositions of the invention in an amount of up to about 40 wt %, preferably up to about 20 wt %, based on the total amount of the composition. The invention further relates to the use of the solid compositions (A) of the invention for producing thermoset compositions.

The invention further relates to a method for producing thermoset compositions, comprising the following steps:

a) dispersing the solid compositions (A) of the invention in one or more reactants capable of forming the thermosetting plastic, or a solution thereof, which optionally comprise plastics additives, more particularly those which are added advantageously prior to dispersing,
b) optionally adding further components and
c) curing the resulting dispersion.

Dispersing Step a)

The abovementioned reactants with the capacity to form the thermosetting polymer are selected preferably from monomers, oligomers (prepolymers) or crosslinking agents for them.

Preferred reactants with the capacity to form the thermosetting polymer B) are selected preferably from the group consisting of the following: polyols and mixtures thereof, aliphatic polyols and mixtures thereof, aliphatic polyether polyols and mixtures thereof, aliphatic polyester polyols and mixtures thereof, aromatic polyester polyols and mixtures thereof, polyether polyester polyols and mixtures thereof, unsaturated polyesters and mixtures thereof, aromatic alcohols or mixtures thereof, styrene, polyisocyanates, isocyanate resins, epoxy resins, phenolic resins, furan resins, caprolactam, dicyclopentadiene, aliphatic and cycloaliphatic amines and polyamines, polyamidoamines, aromatic amines and polyamines, RT- and HT-crosslinking silicones, cyano- and (meth)acrylates, polyallyl compounds, vinyl esters, polycondensation thermosets at the A-stage, and also derivatives, mixtures or solutions of the aforementioned starting products.

Particularly preferred are aliphatic polyols and mixtures thereof, aromatic alcohols, styrene, epoxy resins, amines and unsaturated polyesters.

In one particularly preferred embodiment of the method, the solid composition (A) and the reactant with the capability of forming the thermosetting polymer, this reactant optionally comprising plastics additives which are added advantageously prior to dispersing, are subjected together to treatment by means of a homogenizer, a ball mill, a bead mill, a roller bed, a triple-roll mil, a single- or multiscrew extruder, a kneader and/or a dissolver.

The thermoset compositions of the invention can be produced reproducibly even with technically simple dispersing apparatus such as rolls and dissolvers. As a result of the fine distribution of the microgels (A) in the reactant capable of forming the thermosetting polymer, particularly effective distribution of the microgels in the thermosetting polymer B) subsequently is possible as well, something hitherto possible in the prior art only with a high level of complexity in terms of apparatus. Even using widespread dispersing apparatus, the mechanical properties of the thermoset compositions are surprisingly improved.

The thermoset precursors obtained accordingly are easy to store until the thermosets are formed by curing, optionally with addition of curing agents. On account of their fine distribution, there is no significant sedimentation.

Dispersing is accomplished preferably at a volume-specific energy density of less than 10 kJ/m$^3$, more particularly less than 8 kJ/m$^3$ of thermosetting polymer.

Further Components b)

The aforementioned further components b) for producing the thermoset composition are, in particular, the further (second) component for forming the thermosetting polymer, more particularly the curing agent such as, for example, a polyisocyanate, a polyamine, a formaldehyde donor, styrene, etc. Furthermore, they may also comprise the aforementioned plastics additives, such as fibrous fillers, for example, and others.

Curing c)

Curing takes place in general under the conditions customary for the thermosetting polymer. Step c) takes place more preferably with simultaneous shaping and/or formation of the adhesive bonds between the adherends.

The invention also relates to the thermoset compositions which are obtainable with the above-described solid compositions (A) comprising the microgels.

The invention also relates, furthermore, to the use of the thermoset compositions of the invention as shaped articles, as a coating or bonding material/adhesive. It also includes the production of microgel-filled prepregs, as they are called. The invention, furthermore, also relates, among other applications, to the use of the compositions of the invention in electronic components, for instance as housings for electronic equipment, in construction components such as building materials, in composite components as for the automotive, aircraft or ship travel industry, in one- and two-component adhesives as for the automotive, aircraft, ship travel, electronic or construction industry.

The present invention is illustrated by the following examples. The invention is not, however, confined to the disclosure content of the examples.

EXAMPLES

Examples for the Production and Characterization of the Microgels

Described below is the production of the inventive microgels M1 to M3 used in the further examples. Also described is the production of non-inventive comparative examples B1 to B4 according to the prior art in analogy to EP1674501 (see page 12). Comparative examples K1 to K5 are produced according to the prior art in analogy to US2006/0079609 and are worked up by coagulation. The chemical composition of K1 and M1 is identical, but they differ in work-up. Polymers M1 to M3, B1 to B4 and K1 to K5 are prepared by emulsion polymerization, using the following monomers: 1,3-butadiene (BDN), styrene (ST), acrylonitrile (ACN), hydroxyethyl methacrylate (HEMA), trimethylolpropane trimethacrylate (TMPTMA), methacrylamide (MAA), acrylic acid (AS) and divinylbenzene (DVB). The monomers used for preparing the microgels, and also essential formula constituents, are summarized in the table below:

The figures are based on 100% pure starting materials. AOS and AkylS are sulfonate-containing emulsifiers with the CAS numbers 68439-57-6 (alpha-olefinsulfonate) and 68188-18-1 (alkylsulfonate), respectively.

The polymers were prepared in ≥20 L autoclave with stirring mechanism. For the polymerization batches, the monomers were used together with 0.008 wt % (based on the sum of the monomers) of 4-methoxyphenol. Emulsifier and also the amounts of water reported in the table (minus the amounts of water needed to prepare the aqueous premix solutions and initiator solutions) were introduced first as an initial charge to the autoclave in each case.

After the reaction mixture had been conditioned at 15° C., freshly prepared aqueous premix solution (4% strength) was added to the autoclave in order to activate the initiator. These premix solutions consisted of 0.284 g of ethylenediaminetetraacetic acid, 0.238 g of iron(II) sulfate*7 $H_2O$ (calculated without water of crystallization) and 0.576 g of Rongalit® C (Na formaldehyde-sulfoxylate 2-hydrate, calculated without water of crystallization). First of all half of the solution was added. For initiation, additionally, 0.058 wt % (again based on the sum of all the monomers) of p-menthane hydroperoxide (Trigonox® NT 50 from Akzo-Degussa) was metered into the reactor, having been emulsified in 200 ml of the emulsifier solution prepared in the reactor. For acrylonitrile-containing products, 0.02 wt % was metered in. When the conversion reached 30%, the remaining 50% of the premix solution was metered in.

Temperature management during the polymerization took the form of the setting of coolant quantity and coolant temperature to 15±5° C.

When a polymerization conversion of more than 85% (customarily: 90% to 100%) has been reached, the polymerization was stopped by the addition of an aqueous solution of 2.35 g of diethylhydroxylamine. For the removal of volatile constituents from the latex, the latex was stripped with steam.

The analytical data, determined by the methods described above, is reproduced in the table below. For the precipitation for analysis, the polymers were precipitated at 60° C. with $CaCl_2$ and washed. Comparative examples K1 to K5 were coagulated at 75° C. with NaCl and phosphoric acid in the relatively large quantity required, before being tested for pourability after washing and drying (at 55-60° C. in a drying oven under reduced pressure to constant weight).

|  | Water [g] | Emulsifiers | | Monomers | | | | | | | |
|---|---|---|---|---|---|---|---|---|---|---|---|
|  |  | Oleic acid [g] | AOS/ AkylS [g] | BDN [g] | ST [g] | ACN [g] | TMPTMA [g] | HEMA [g] | AS [g] | MAA [g] | DVB [g] |
| M1 | 12900 | 129 | 226/— | 3120 | — | 795 | 172 | 215 | — | — | — |
| M2 | 11200 | 168 | 280/— | 3140 | — | 2085 | 225 | — | 155 | — | — |
| M3 | 12900 | 129 | 86/— | 3175 | — | 813 | 172 | — | — | 140 | — |
| B1 | 11000 | — | —/154 | 4110 | — | — | 70 | 220 | — | — | — |
| B2 | 11000 | — | —/154 | 3700 | 420 | — | 70 | 220 | — | — | — |
| B3 | 12900 | — | —/215 | 3225 | — | 1075 | — | — | — | — | — |
| B4 | 12900 | 129 | 86/— | 3100 | — | 1030 | 172 | — | — | — | — |
| K1 | 12900 | 129 | 226/— | 3120 | — | 795 | 172 | 215 | — | — | — |
| K2 | 12900 | 129 | 226/— | 3363 | 860 | — | — | — | — | — | 77 |
| K3 | 12900 | 129 | 226/— | 3784 | 430 | — | — | — | — | — | 91 |
| K4 | 12900 | 129 | 226/— | 3741 | 430 | — | 129 | — | — | — | — |
| K5 | 12900 | 129 | 226/— | 4193 | — | — | — | — | — | — | 108 |

| Microgel | Diameter of primary particles [nm][1] | Gel content [%][2] | Swelling index[3] | Tg [° C.][4] | Tg breadth [° C.][5] | OH number [mg$_{KOH}$/g$_{Pol.}$][6] | Acid number [mg$_{KOH}$/g$_{Pol.}$][7] |
|---|---|---|---|---|---|---|---|
| M1 | 82 | 81 | 6.6 | −41 | 22 | 23.7 | 8.0 |
| M2 | 75 | 99 | 3.3 | −19 | 19 | 1.0 | 12.4 |
| M3 | 57 | 96 | 9.2 | −41 | 23 | 6.5 | 11.3 |
| B1 | 40 | 95 | 14.6 | −80 | 6 | 13.2 | 3.1 |
| B2 | 47 | 95 | 17.5 | −69 | 6 | 17.0 | 3.8 |
| B3 | 72 | 30 | 27.2 | −34 | 10 | 4.8 | 4.2 |
| B4 | 52 | 73 | 6.1 | −38 | 23 | 5.6 | 7.4 |
| K1 | 82 | 81 | 6.6 | −41 | 22 | 23.7 | 8.0 |
| K2 | 44 | 93 | 9.2 | −57 | 8 | ** | ** |
| K3 | 38 | 92 | 10.5 | −68 | 7 | ** | ** |
| K4 | 37 | 47 | 37 | −70 | 8 | ** | ** |
| K5 | 45 | 94 | 10.9 | −74 | 12 | ** | ** |

[1-7] determined by the methods described above,
** not measured

Examples for the Spray Drying of the Microgels and their Characterization

The spray drying of the emulsion polymers (latex) obtained according to M1-M3 and B1-B4 was carried out using a Büchi B-290 laboratory spray drier, the settings selected being typically as follows: flow 40 mm ≙ 473 l/h, air entry temperature 135° C., nozzle cleaner setting 2, pump at 45%, air exit temperature about 75° C. Prior to the spray drying, the latex used was passed through a 50 µm Monodur cloth. Prior to the actual spray drying, the spray drier was heated by spraying with water. The portion of the dried polymer put to further use was the portion which deposits in the cyclone and/or in the catch vessel on spray drying. Material which deposits on the wall of the spraying cylinder or passes through the cyclone to the outgoing air filter was considered lost. The spray drying yield is therefore calculated as the ratio between amount actually obtained and amount theoretically possible. The latter is a product of the amount of latex used and its solids concentration. The spraying operation ran continuously over several hours, in order to ensure steady-state operation.

The material deposited in the cyclone and/or catch vessel was subsequently placed in a screw-top PE container and admixed with a specified amount of powder composition. This composition consisted of 2 wt % of the precipitated silica Sipernat® D17 (Evonik Degussa GmbH). Mixing took place in a Turbula® T2F tumble mixer from Willy A. Bachofen AG Maschinenfabrik, with a transmission setting of 49 rpm in a mixing time of 30 minutes.

Pourability Test

Pourability tests were subsequently carried out on the powdered material, as in EN ISO 6186:1998, Method A. The pourability is evaluated from the flow time and the flow behaviour of 150 g of powder through a funnel with a specified nozzle size (10, 15 or 25 mm exit diameter; in the present case, 15 mm was selected).

Determination of the Bulk Density

Also determined was the bulk density of the material, as in EN ISO 60:1999. For this purpose, the mass of 100 ml of powder was measured and the bulk density was reported in g/ml. For both of the stated tests, a Fluometer from KARG Industritechnik was used.

Blocking Tendency

The blocking tendency of the powders was likewise ascertained. The test took place according to an in-house protocol. The filling form is placed on a flat baseplate and the sample is introduced. The filling form is a stainless steel pipe with smooth surfaces, possessing an internal diameter of 45 mm and a height of 50 mm. The quantity of sample is selected so as to form presscakes of approximately 1 cm. The aluminium die is then placed on top of the sample material, this die likewise possessing a diameter of 45 mm and also a weight of 178 g. The die is weighted with a weight of 4.7 kg and the test time of 24 hours is commenced. After the time has elapsed, the weight is removed, the die is withdrawn and the filling form is removed, without damaging the presscake in the process. The test result is the visual evaluation of the presscake according to the following criteria:

1=Sample does not block, and falls apart immediately after removal of the form
2=Sample exhibits only slight blocking, and falls apart under low pressure
3=Sample exhibits slight blocking, sticks together, and can be broken apart with gentle pressure
4=Sample exhibits high blocking, can be separated only with application of force, and breaks down again into original sample
5=Sample undergoes hard blocking, can be separated only with application of force, and fragments continue to stick together
6=Sample can no longer be separated within the test Optical Quality Lastly, the quality of the spray-dried material per se was subjected to visual assessment, and evaluated using the following criteria:

1=Material with very uniformly fine particle size distribution, very low tack, no discoloration, very little dusting, undisrupted spray drying
2=Material with only a small fraction of relatively large agglomerates, little tack, slight discoloration, little dusting, spray drying mostly undisrupted
3=Material with significant fraction of relatively large agglomerates or a number of particularly large agglomerates, slightly tacky, slightly dusting, slightly discoloured, spray drying often disrupted 4=Material with agglomerates of many different particles sizes, tacky, dusting, discoloured, spray drying very often interrupted by disruption 5=Material with very non-uniform particle size distribution, very tacky, highly dusting, highly discoloured, spray drying almost impossible to implement 6=No powder material obtained, spray drying impossible to implement The table below summarizes the results.

| Microgel | Pourability [s]/Nozzle Ø 15 mm | Bulk density [g/l] | Spray drying yield [%] | Blocking | Quality |
|---|---|---|---|---|---|
| M1 | 21 | 185.0 | 39.4 | 4 | 2 |
| M2 | 22 | 261.5 | 46.5 | 1 | 1 |
| M3 | 28 | 166.5 | 40.7 | 4 | 2 |
| Comparative | | | | | |
| B1 | not pourable | 145.1 | 29.8 | 5 | 5 |
| B2 | 35 | 169.4 | 27.3 | 5 | 5 |
| B3 | —[1)] | —[1)] | —[1)] | —[1)] | 6 |
| B4 | 29 | 156.1 | 49.8 | 5 | 5 |

[1)]Spray drying yields only stuck-together product, hence no analysis possible.

Even at the largest nozzle diameter of 25 mm, the comparative examples K1 to K5 are not pourable and are not suitable for solving the problem addressed by the invention.

As can be seen, moreover, from a comparison between the inventive examples and the prior-art examples for microgels, the spray drying of the inventive microgels produces material which, on account of the inventive combination of features, is highly suitable for metering in powder form. The prior art is not suitable for spray drying or produces only spray-dried material with no pourability or only very poor pourablity at all, exhibiting relatively low bulk densities, which may be obtained in significantly poorer yields, has a very strong blocking tendency, is of markedly more non-uniform and poor quality, and overall is unsuited to processing by spray drying.

Example of High Dispersibility of the Inventive Microgels by Means of a Simple Dissolver The spray-dried and powdered inventive microgel M3 above was dispersed using a vacuum dissolver in the epoxy resin reactant Araldite® LY 564 (Huntsman). The particle concentration was set so as to give a fraction of 5 wt % for the microgel in the polymeric mixture, after the admixing of curing agent, dependent on the specific formula selected. In the reactant of the epoxy resin for curing, the microgel concentration must be higher accordingly. In the present example, the fraction of the powdered microgel M3 in the epoxy resin reactant mixture was 7 wt %. Dispersing took place at 5000 rpm, with the temperature of the mixture kept at between 20 and 45° C.

The particle size distribution in the epoxy resin reactant was determined at four different dispersing times by means of dynamic light scattering. Here it was possible to show that after 15 minutes there is substantially no longer any change in the particle size distribution as a result of disruption of the microgel agglomerates. After just a short mixing time and with very simple apparatus, a dispersion of the microgel particles down to primary particle size is reached, evident from the radius of the particles detected. This is in very good agreement with the diameter of the microgel particles as determined before spray drying and dispersing in the polymer latex.

Example for the Modification of Epoxy Resins and Evaluation Using Mechanical Data For the production of the thermoset mixtures, the respective particles were dispersed using a vacuum dissolver in the epoxy resin reactant Araldite® LY 564 (Huntsman) at 5000 rpm for 60 minutes, during which the temperature of the mixture was kept at between 20 and 45° C. The amount of particles selected in each case was such that their fraction in the subsequent overall mixture was 5 wt %. Also added to the mixture, at the start, was the curing component Aradur® 2954 (Huntsman) in a concentration 35 phr (parts per hundred resin, in other words e.g. 35 g of curing agent to 100 g of resin reactant) and also 0.2 phr of the deaerating agent Byk®-A 515, and these components were also dispersed.

For the determination of the mechanical properties, specimens were produced in the dimensions required in the respective standards. Curing took place on the basis of a temperature program established for this resin/curing agent system, of 2 hours at 60° C. plus a further 8 hours at 120° C.

As described in DIN EN ISO 178, three-point bending measurements (3PB) were carried out on a Zwick universal testing machine, to determine the flexural modulus $E_f$, the flexural strength $\sigma_{fm}$ and the maximum deformation $\varepsilon_{fm}$. The toughness of the materials was determined on Compact Tension (CT) specimens according to ISO 13586 on a Zwick universal testing machine, with the $K_{Ic}$ values determined serving as a measure of the fracture toughness, and the $G_{Ic}$ values serving as a measure of the fracture energy which can be accommodated. Charpy impact toughnesses Ak were carried out on a testing apparatus from Ceast as described in DIN ISO 179/1 fU.

The results obtained are set out in the table below. P52 is the commercially available impact modifier Genioperl® P52 (Wacker Chemie AG) in powder form. For the samples M1, the spray-dried and powdered microgel M1 above was used. Serving as a reference are unmodified specimens produced without the addition of a modifier to the resin mixture.

| | $E_f$ [GPa] | $\sigma_{fm}$ [MPa] | $\varepsilon_{fm}$ [%] | $K_{Ic}$ [MPa·m$^{0.5}$] | $G_{Ic}$ [kJ/m$^2$] | aK [kJ/mm$^2$] |
|---|---|---|---|---|---|---|
| M1 | 2.41 | 100 | 7.5 | 1.21 | 0.65 | 35 |
| P52 | 2.40 | 104 | 7.9 | 1.07 | 0.48 | 41 |
| Reference | 2.47 | 110 | 7.7 | 0.66 | 0.18 | 29 |

The results show that modifying the thermoset mixture with microgels of the invention is possible with simple means and that the modification with microgels of the invention advantageously influences the properties of the mixture. Fracture toughness and impact toughness are increased to a large extent, not least in comparison with alternative solutions, while the other mechanical properties, as desired, are influenced only marginally.

What is claimed is:

1. Particulate compositions comprising at least one copolymer comprising copolymer units based on at least the following comonomers
   a) conjugated diene,
   b) α,β-unsaturated nitrile,
   c) at least one polyfunctional radically polymerizable comonomer, and d) at least one comonomer selected from the group consisting of carboxyl-, hydroxyl-, epoxy- and amino-group-functional radically polymerizable comonomer, wherein the compositions are solid at 20° C., comprise spray dried primary particles that have an average particle diameter of 5 to 500 nm, and have a pourability to EN DIN 6186:1998 (funnel diameter 15 mm) of not more than 33 s, and wherein the particulate composition contains a release agent.

2. The particulate compositions according to claim 1, wherein the amount of copolymer units based on the conjugated diene, is 10 to 98.5 wt %, based on the total amount of all copolymer units.

3. The particulate compositions according to claim 1, wherein the amount of copolymer units based on the α,β-unsaturated nitriles is 0.5 to 60 wt %, based on the total amount of all copolymer units.

4. The particulate compositions according to claim 1, wherein the amount of copolymer units based on component c) is 0.5 to 10 wt %, based on the total amount of all copolymer units.

5. The particulate compositions according to claim 1, wherein the amount of copolymer units based on component d) is 0.5 to 20 wt %, based on the total amount of all copolymer units.

6. The particulate compositions according to claim 1, wherein the polyfunctional, radically polymerizable comomoner is selected from monomers which have two or more functional, radically polymerizable groups.

7. The particulate compositions according to claim 1, wherein the comonomer d) is selected from the group consisting of acrylic acid, methacrylic acid, maleic acid, fumaric acid, itaconic acid, amine-functionalized (meth)acrylates, secondary aminoalkyl (meth)acrylic esters, (meth)acrylamides, hydroxy-functionalized (meth)acrylates, polyethylene glycol (meth)acrylates, epoxy-functional monomers, and alkyl, alkoxyalkyl, hydroxyalkyl, cycloalkyl, alkylcycloalkyl, and aryl monoesters or diesters of α,β-unsaturated dicarboxylic acids, it being possible for the esters to be mixed esters in the case of the diesters, and mixtures thereof.

8. The particulate compositions according to claim 1, wherein the release agent comprises up to 20 wt % of the composition.

9. A method of producing the particulate compositions according to claim 1, the method comprising:
subjecting components a) to d) to an emulsion polymerization to form polymer particles; and
subsequently spray-drying the polymer particles, and adding a release agent.

10. An additive for thermoset compositions, the additive comprising the particulate compositions according to claim 1.

11. Thermoset compositions comprising:
A) a particulate composition according to claim 1, and
B) a thermosetting polymer.

12. A method for producing the thermoset compositions according to claim 11, the method comprising:
a) dispersing the particulate composition in one or more reactants capable of forming the thermosetting polymer, or a solution thereof, which optionally comprise plastics additives,
b) optionally adding further components, and
c) curing the resulting dispersion.

13. Shaped articles, coating material, joining material, or adhesive comprising the thermoset compositions according to claim 11.

14. The particulate compositions according to claim 1, wherein:
the powder has a dynamic viscosity of greater than 1000 Pas at 20° C. under 1 bar atmospheric pressure;
the amount of copolymer units based on the conjugated diene, is 10 to 98.5 wt %, based on the total amount of all copolymer units;
the amount of copolymer units based on the α,β-unsaturated nitriles is 0.5 to 60 wt %, based on the total amount of all copolymer units;
the amount of copolymer units based on component c) is 0.5 to 10 wt %, based on the total amount of all copolymer units; and
the amount of copolymer units based on component d) is 0.5 to 20 wt %, based on the total amount of all copolymer units.

15. The particulate compositions according to claim 14, wherein:
the conjugated diene comprises ($C_4$-$C_6$) conjugated dienes;
the α,β-unsaturated nitrile comprises ($C_3$-$C_5$)-α,β-unsaturated nitriles;
the polyfunctional radically polymerizable comonomer comprises monomers having 2, 3 or 4 polymerizable C=C double bonds; and
the carboxyl-, hydroxyl-, epoxy- and/or amino-group-functional radically polymerizable comonomer comprises acrylic acid, methacrylic acid, maleic acid, fumaric acid, itaconic acid, amine-functionalized (meth)acrylates, acrolein, N-vinyl-2-pyrrolidone, N-vinylimidazole, 2-vinylpyridine, 4-vinylpyridine, N-allylurea, N-allylthiourea, (meth)acrylamides, hydroxy-functionalized (meth)acrylates, polyethylene glycol (meth)acrylates, polypropylene glycol (meth)acrylates, epoxy-functional monomers, monoesters or diesters of α,β-unsaturated dicarboxylic acids, and mixtures thereof.

16. The particulate compositions according to claim 14, wherein:
the conjugated diene comprises 1,3-butadiene, isoprene, 2,3-dimethylbutadiene, piperylene, or mixtures thereof;
the α,β-unsaturated nitrile comprises acrylonitrile, methacrylonitrile, ethacrylonitrile, or mixtures thereof;
the polyfunctional radically polymerizable comonomer comprises diisopropenylbenzene, divinylbenzene, divinyl ether, divinyl sulfone, diallyl phthalate, triallyl cyanurate, triallyl isocyanurate, 1,2-polybutadiene, N,N'-m-phenylenemaleimide, 2,4-tolylenebis(maleimide), triallyl trimellitate, acrylamides methylene-bisacrylamide, hexamethylene-1,6-bisacrylamide, diethylenetriaminetrismethacrylamide, bis(methacrylamidopropoxy)ethane, 2-acrylamidoethyl acrylate, and polyfunctional acrylates, methacrylates and itaconates of polyhydric $C_2$ to $C_{10}$ alcohols selected from ethylene glycol, 1,2-propanediol, 1,4-butanediol, hexanediol, polyethylene glycol having 2 to 20, especially 2 to 8, oxyethylene units, neopentyl glycol, bisphenol A, glycerol, trimethylolpropane, pentaerythritol and sorbitol with unsaturated polyesters formed from aliphatic diols and polyols, and mixtures thereof; and
the carboxyl-, hydroxyl-, epoxy- and/or amino-group-functional radically polymerizable comonomer comprises acrylic acid, methacrylic acid, maleic acid, fumaric acid, itaconic acid, aminoethyl (meth)acrylate, aminopropyl (meth)acrylate, aminobutyl (meth)acrylate, tert-butylamino($C_2$-$C_4$)alkyl (meth)acrylate, acrolein, N-vinyl-2-pyrrolidone, N-vinylimidazole, 2-vinylpyridine, 4-vinylpyridine, N-allylurea and N-allylthiourea, (meth)acrylamide, singly or doubly N-substituted (meth)acrylamides, hydroxyethyl methacrylate (HEMA), hydroxypropyl (meth)acrylate, hydroxybutyl (meth)acrylate, hydroxy- or methoxypolyethylene glycol methacrylate, polypropylene glycol (meth)acrylates, glycidyl (meth)acrylate, or ethyl, n-propyl, isopropyl, n-butyl, tert-butyl, n-pentyl or n-hexyl monoesters or diesters, $C_3$-$C_8$ alkoxyalkyl monoesters or diesters, $C_2$-$C_8$ hydroxyalkyl monoesters or diesters, $C_6$-$C_{12}$ cycloalkyl monoesters or diesters, $C_7$-$C_{10}$ alkylcycloalkyl monoesters or diesters, $C_6$-$C_{14}$ aryl monoesters or diesters, it being possible for the esters also to be mixed esters in the case of the diesters, and mixtures thereof.

17. The particulate compositions according to claim 1, wherein:
the conjugated diene comprises butadiene, and the amount of copolymer units based on the butadiene, is 25 to 85 wt %, based on the total amount of all copolymer units;
the α,β-unsaturated nitrile comprises acrylonitrile, and the amount of copolymer units based on the acrylonitrile is 15 to 50 wt %, based on the total amount of all copolymer units;
the polyfunctional radically polymerizable comonomer comprises trimethylolpropane trimethacrylate, and the amount of copolymer units based on trimethylolpropane trimethacrylate is 0.5 to 5 wt %, based on the total amount of all copolymer units; and
the carboxyl-, hydroxyl-, epoxy- and/or amino-group-functional radically polymerizable comonomer is at least one monomer selected from the group of hydroxyethyl methacrylate (HEMA), acrylic acid, methacrylic acid, glycidyl methacrylate, vinylpyridine, vinylimidazole and methacrylamide, and the amount of copolymer units based on component d) is 1 to 10 wt %, based on the total amount of all copolymer units.

18. The particulate compositions according to claim 17, further comprising:
up to 20 wt % of a release agent, based on the composition, wherein the release agent is selected from the group consisting of silica, calcium carbonate, silicate and fatty acid salts; and
up to 20 wt % based on the composition, of further structural units based on radically polymerizable monomers e), which are different from components a) to d), and are selected from the group consisting of styrene, isoprene, 2-chlorobutadiene, 2,3-dichlorobutadiene, ethyl (meth)acrylate, methyl (meth)acrylate, n-propyl (meth)acrylate, n-butyl (meth)acrylate, 2-ethylhexyl (meth)acrylate, tetrafluoroethylene, vinylidene fluoride, hexafluoropropene, and mixtures thereof.

19. The particulate compositions according to claim 1, wherein the polyfunctional, radically polymerizable comomoner is selected from divinylbenzene, trimethylolpropane trimethacrylate (TMPTMA), trimethylolpropan triacrylate, ethylene glycol dimethacrylate, ethylene glycol diacrylate, butane-1,4-diol di(meth)acrylate and mixtures thereof.

20. The particulate compositions according to claim 1, wherein the comonomer d) is selected from the group consisting of acrylic acid, methacrylic acid, maleic acid, fumaric acid, itaconic acid, aminoethyl (meth)acrylate, aminopropyl (meth)acrylate, aminobutyl (meth)acrylate, tert-butylamino($C_2$-$C_4$)alkyl (meth)acrylate, acrolein, N-vinyl-2-pyrrolidone, N-vinylimidazole, 2-vinylpyridine, 4-vinylpyridine, N-allylurea, N-allylthiourea, (meth)acrylamide, singly or doubly N-substituted (meth)acrylamides, hydroxyethyl methacrylate (HEMA), hydroxypropyl (meth)acrylate, hydroxybutyl (meth)acrylate, hydroxy- or methoxypolyethylene glycol methacrylate, polypropylene glycol (meth)acrylates, glycidyl (meth)acrylate, and alkyl, alkoxyalkyl, hydroxyalkyl, cycloalkyl, alkylcycloalkyl, and aryl monoesters or diesters of α,β-unsaturated dicarboxylic acids, it being possible for the esters to be mixed esters in the case of the diesters, and mixtures thereof.

* * * * *